US010454719B1

United States Patent
Rottela et al.

(10) Patent No.: US 10,454,719 B1
(45) Date of Patent: Oct. 22, 2019

(54) METHOD OF DETERMINING OPTIMUM TAP COEFFICIENTS FOR CHANNEL SMOOTHING

(71) Applicant: Marvell International LTD., Hamilton (BM)

(72) Inventors: Sri Varsha Rottela, Visakhapatnam (IN); Vijay Ahirwar, Bhopal (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 16/036,116

(22) Filed: Jul. 16, 2018

Related U.S. Application Data

(60) Provisional application No. 62/656,744, filed on Apr. 12, 2018.

(51) Int. Cl.
*H04L 25/02* (2006.01)
*H04B 17/336* (2015.01)

(52) U.S. Cl.
CPC ....... *H04L 25/0232* (2013.01); *H04B 17/336* (2015.01); *H04L 25/0216* (2013.01)

(58) Field of Classification Search
CPC ............... H04L 25/022; H04L 27/2647; H04L 25/0216; H04L 25/03159; H04L 25/0222; H04L 27/01; H04L 25/0202; H04L 25/0234; H04L 25/0232; H04L 25/03305; H04L 25/025; H04B 7/0626; H04B 7/17336

See application file for complete search history.

(56) References Cited

U.S. PATENT DOCUMENTS

| | | | | |
|---|---|---|---|---|
| 7,394,873 B2* | 7/2008 | Maltsev | ............. | H04L 25/0216 375/143 |
| 8,249,203 B2* | 8/2012 | Sun | ...................... | H04L 25/0204 327/551 |
| 2006/0067441 A1* | 3/2006 | Park | .................... | H04L 25/0216 375/346 |
| 2009/0285315 A1* | 11/2009 | Wu | ....................... | H04L 25/022 375/260 |
| 2010/0183104 A1* | 7/2010 | Alexander | ............ | H04L 25/022 375/346 |
| 2011/0026652 A1* | 2/2011 | Kent | ..................... | H04L 5/0023 375/346 |
| 2012/0209900 A1* | 8/2012 | Sorokine | ............. | H04L 25/0216 708/309 |
| 2012/0314750 A1* | 12/2012 | Mehrabani | ............. | H04L 27/01 375/229 |

* cited by examiner

*Primary Examiner* — Khanh C Tran

(57) ABSTRACT

A receiver includes a channel estimation module, a delay spread module, and a smoothing module. The channel estimation module generates a channel estimate for a channel in frequency domain based on a signal received through the channel in time domain. The delay spread module determines a delay spread of the channel in the time domain. The delay spread is an amount of time after which a channel response drops to less than or equal to a predetermined threshold. The smoothing module smooths the channel estimate by applying a filter with unequal taps in the frequency domain. The taps are based on the delay spread. The filter does not attenuate samples of the channel response within the delay spread in the time domain. The filter attenuates noise outside the delay spread of the channel.

20 Claims, 12 Drawing Sheets

METHOD OF DETERMINING OPTIMUM TAP COEFFICIENTS FOR CHANNEL SMOOTHING

CROSS-REFERENCE TO RELATED APPLICATIONS

This application claims the benefit of U.S. Provisional Application No. 62/656,744, filed on Apr. 12, 2018. The entire disclosure of the application referenced above is incorporated herein by reference.

FIELD

The present disclosure relates generally to communication systems and more particularly to determining optimum tap coefficients for smoothing channel estimates in receivers.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Channel estimation is an important parameter determined by a receiver generally in any communication system and particularly in wireless communication systems due to the variable nature of the channel. The performance of the receiver and many operations performed by the receiver depend on the quality of the channel estimation. Communication systems such as wireless local area networks, cellular networks, etc. provide pilot tones or training sequences in transmit signals or packets, which the receiver can use to estimate the channel. The channel conditions, particularly in a wireless channel, change dynamically. Accordingly, the channel needs to be estimated dynamically. For example, in wireless local area networks, the channel is estimated on a per packet basis.

SUMMARY

A receiver comprises a channel estimation module, a delay spread module, and a smoothing module. The channel estimation module generates a channel estimate for a channel in frequency domain based on a signal received through the channel in time domain. The delay spread module determines a delay spread of the channel in the time domain. The delay spread is an amount of time after which a channel response drops to less than or equal to a predetermined threshold. The smoothing module smooths the channel estimate by applying a filter with unequal taps in the frequency domain. The taps are based on the delay spread. The filter does not attenuate samples of the channel response within the delay spread in the time domain. The filter attenuates noise outside the delay spread of the channel.

In another feature, the taps are selected from a plurality of taps determined a priori for various values of delay spread and stored in a lookup table.

In another feature, the receiver further comprises a tap generating module to generate the taps based on the delay spread.

In another feature, the receiver further comprises a signal to noise ratio (SNR) module to determine an SNR of the signal in the time domain. The taps are further based on the SNR.

In other features, the signal is modulated using orthogonal frequency domain multiplexing (OFDM) and has a constellation size, and the taps are further based on the constellation size of the signal.

In another feature, the smoothing module interpolates a plurality of frequency tones of the signal using the unequal taps to smooth the channel estimate.

In another feature, a number of frequency tones selected for smoothing is based on a coherence bandwidth of the channel, which is a frequency bandwidth for which channel characteristics remain similar.

In other features, the receiver further comprises a signal to noise ratio (SNR) module to determine an SNR of the signal in the time domain. The taps are selected from a plurality of taps stored in a lookup table based on the delay spread and the SNR.

In other features, the receiver further comprises a signal to noise ratio (SNR) module to determine an SNR of the signal in the time domain and a tap generating module to generate the taps based on the delay spread and the SNR.

In another feature, the filter has an inverse step response in the time domain.

In other features, the receiver further comprises an equalizer module to equalize data in the signal based on the smoothed channel estimate, and a decoder decodes the equalized data.

In still other features, a method comprises generating a channel estimate for a channel in frequency domain based on a signal received through the channel in time domain. The method further comprises determining a delay spread of the channel in the time domain. The delay spread is an amount of time after which a channel response drops to less than or equal to a predetermined threshold. The method further comprises smoothing the channel estimate by applying a filter with unequal taps in the frequency domain. The method further comprises equalizing data in the signal based on the smoothed channel estimate and decoding the equalized data. Taps are based on the delay spread. The filter has an inverse step response in the time domain. The filter does not attenuate samples of the channel response within the delay spread in the time domain. The filter attenuates noise outside the delay spread of the channel.

In another feature, the method further comprises selecting the taps from a plurality of taps determined a priori for various values of delay spread and stored in a lookup table.

In another feature, the method further comprises generating the taps based on the delay spread.

In other features, the method further comprises determining a signal to noise ratio (SNR) of the signal in the time domain and selecting the taps further based on the SNR.

In other features, the signal is modulated using orthogonal frequency domain multiplexing (OFDM) and has a constellation size, and the method further comprises selecting the taps further based on the constellation size of the signal.

In another feature, the smoothing comprises interpolating a plurality of frequency tones of the signal using the unequal taps to smooth the channel estimate.

In another feature, the interpolating comprises selecting a number of frequency tones for smoothing based on a coherence bandwidth of the channel, which is a frequency bandwidth for which channel characteristics remain similar.

In other features, the method further comprises determining a signal to noise ratio (SNR) of the signal in the time domain and selecting the taps from a plurality of taps stored in a lookup table based on the delay spread and the SNR.

In other features, the method further comprises determining a signal to noise ratio (SNR) of the signal in the time domain and generating the taps based on the delay spread and the SNR.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Wireless receivers can improve channel estimates using techniques such as averaging, channel smoothing, and so on. For example, in wireless local area networks, multiple copies of training sequences are transmitted in wireless packets. Accordingly, a receiver can generate multiple channel estimates for a wireless channel based on the multiple copies of training sequences received in a packet. The receiver can then take an average of the multiple channel estimates and use the average channel estimate to perform other operations.

The quality of channel estimates depends primarily on signal-to-noise ratio (SNR) of the signal received by the receiver. Lower SNR can result in less accurate channel estimation due to noise. To reduce the effect of noise on channel estimation, channel smoothing across tones can be performed.

Figure 1:
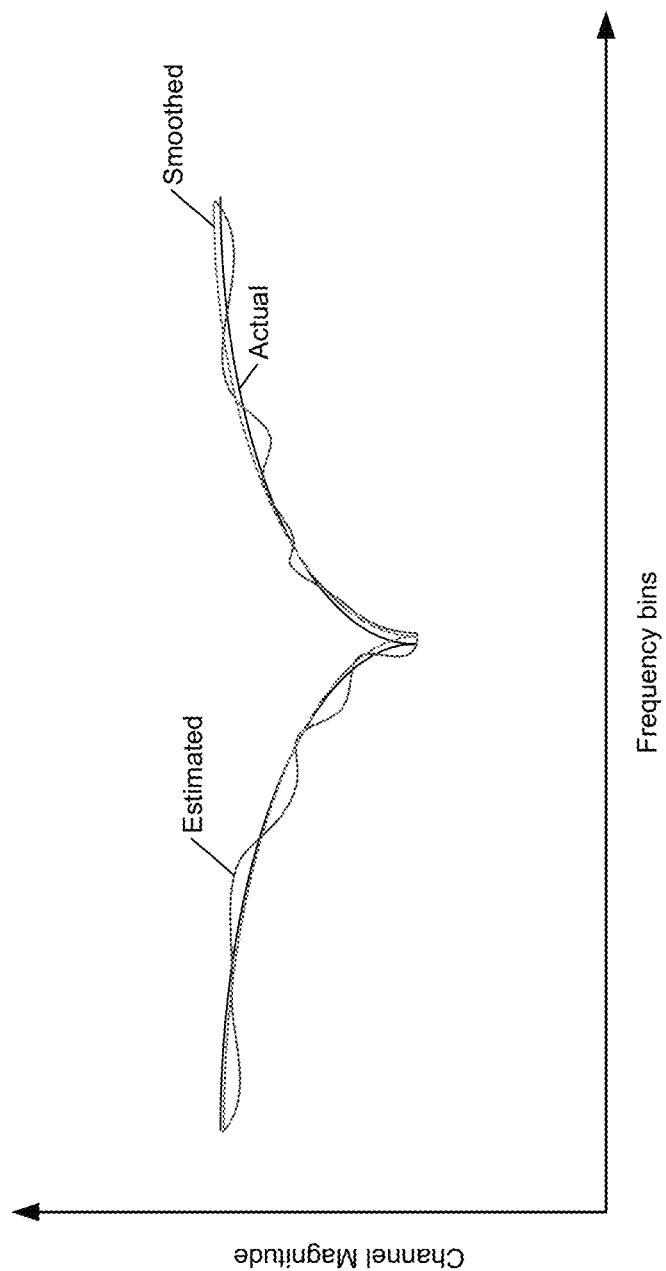
FIG. 1 illustrates channel smoothing.

FIG. 1 shows an example of channel smoothing. Depending on the SNR, the channel estimate may not be smooth and may contain errors due to effects of noise. Channel smoothing reduces the effects of noise on the channel estimate and brings the channel estimate closer to the actual channel.

Smoothing is a type of filtering operation performed in frequency domain where channel response is smoothed using interpolation. The number of tones selected for smoothing (e.g., 3 tones, 5 tones, etc.) is based on a coherence bandwidth of the channel (explained below). One implementation of interpolation is using an FIR filter. Smoothing performed using a smoothing filter in frequency domain is equivalent to performing multiplication of channel taps in time domain response of the smoothing filter. Typically, smoothing uses linear interpolation where equal weights are applied to all the selected tones. Equal weightage, however, is not optimum for all channels.

The present disclosure proposes systems and methods for improving channel estimates by applying unequal weights to the tones selected for interpolation during channel smoothing. The weights depend on channel characteristics. The best weights are selected based on the delay spread of the channel, SNR, and other factors. These and other aspects of the present disclosure are described below in detail.

The present disclosure is organized as follows. Before presenting a detailed description of the aspects of the present disclosure, the terms used throughout the present disclosure are introduced and described with reference to FIGS. 2 and 3. Examples of channel responses in time domain and frequency domain are described with reference to FIGS. 4A-5B. Examples of channel smoothing responses in time domain are described with reference to FIGS. 6 and 7. Examples of implementations of a receiver that smooths channel estimates according to the present disclosure are described with reference to FIGS. 8A and 8B. A method for smoothing channel estimates according to the present disclosure is described with reference to FIG. 9.

The following discussion introduces and describes the terms delay spread and coherence bandwidth of a channel. The characteristics of a transmitted wireless signal change as the wireless signal travels through a channel (i.e., medium, e.g., air) from a transmitter antenna to a receiver antenna. These characteristics depend on the distance between the two antennas, the path(s) followed by the wireless signal, and the environment (buildings and other objects) around the path(s). A profile of the received signal can be obtained from that of the transmitted signal using a model of the channel between the transmitter and the receiver.

In general, a power profile or a power delay profile (PDP) of the received signal is a plot or graphs of received signal magnitude (or magnitude square) against time. The PDP of the received signal can be obtained by convolving a PDP of the transmitted signal with the impulse response of the channel. Convolution in time domain is equivalent to multiplication in frequency domain. Therefore, a transmitted signal x, after propagation through a channel H becomes y, which can be modeled as: y(f)=H(f)x(f)+n(f), where H(f) is the channel response, and n(f) is the noise. Note that x, y, H, and n are all functions of the signal frequency f.

Figure 2:
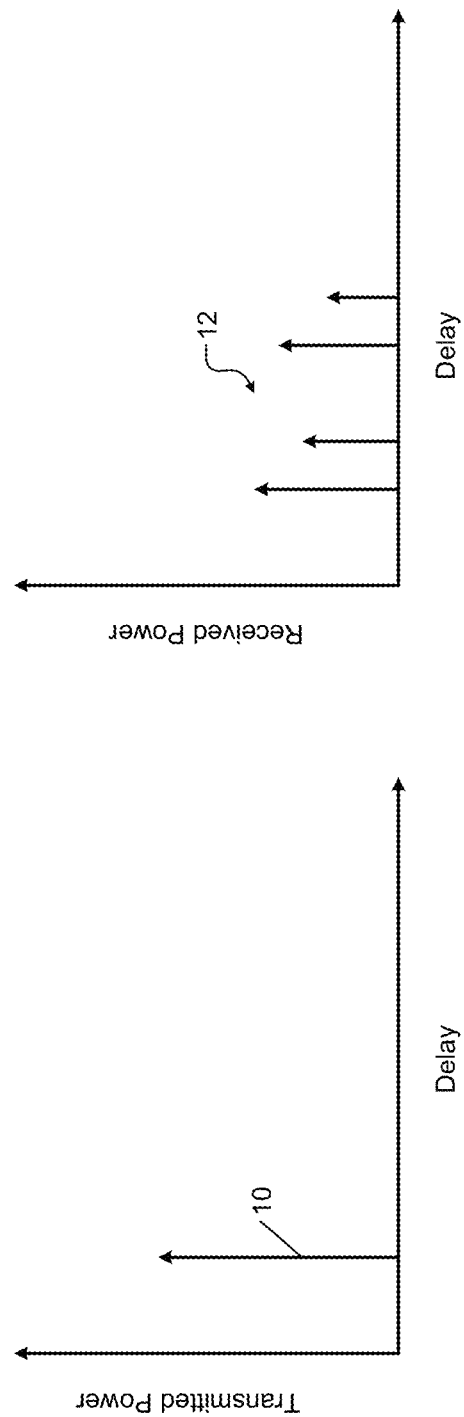
FIG. 2 illustrates a delay profile of a received signal.

FIG. 2 shows that a single impulse 10 sent from a transmitter generally results in multiple copies 12 being received at different times at a receiver because different paths followed by the transmitted signal from the transmitter to the receiver are generally of different lengths. A maximum delay after which the received signal becomes negligible is called a maximum delay spread, $\tau_{max}$. A large value of $\tau_{max}$ indicates a highly dispersive channel. Throughout the present disclosure, the maximum delay spread is simply called a delay spread.

One way to represent the impulse response of a multipath channel is by a discrete number of impulses as follows:

$$h(t, \tau) = \sum_{i=1}^{N} c_i(t)\delta(\tau - \tau_i)$$

Figure 3:
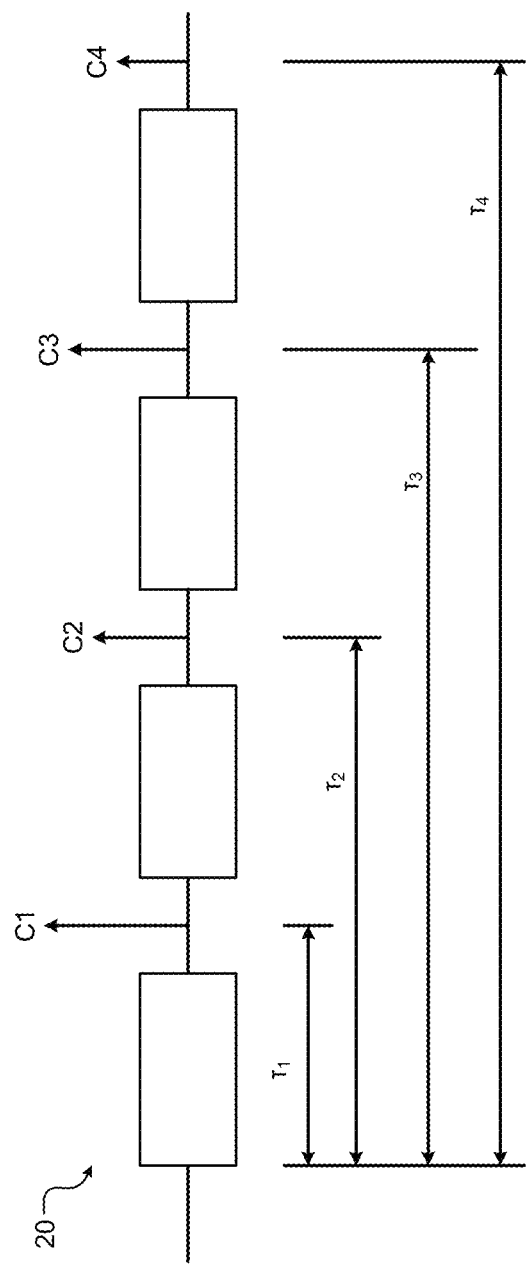
FIG. 3 shows a tapped delay line model of a received signal.

The impulse response h varies with time t. The N coefficients $c_i(t)$ vary with time. This model represents the channel by a delay line with N taps. For example, the channel presumed in FIG. 2 can be represented by a delay line 20 with 4 taps as shown in FIG. 3.

The channel characteristics (e.g., path loss, shadowing, fading, interference, Doppler shift, etc.) change whenever the transmitter, receiver, or any object in the channel moves. Simplistically, the time for which the channel characteristics can be assumed to be constant is called a coherence time, and the frequency bandwidth for which the channel characteristics remain similar is called coherence bandwidth. The coherence bandwidth is inversely related to the delay spread. The larger the delay spread, lesser is the coherence bandwidth, and the channel is said to become more frequency selective.

Figure 4A:
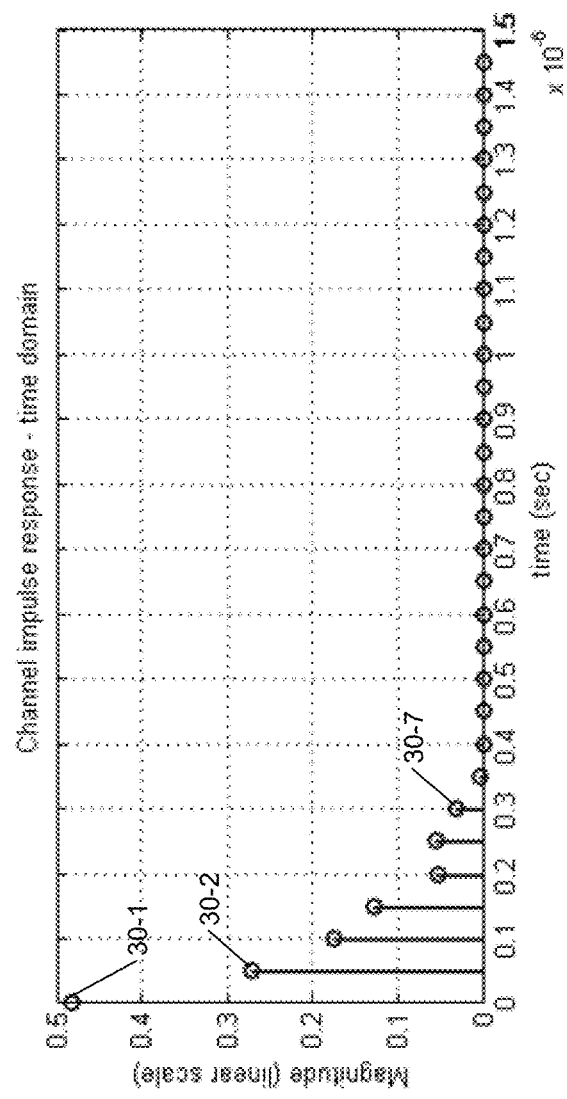
FIGS. 4A and 4B respectively show a first example of channel response in time domain and frequency domain.
Figure 4B:
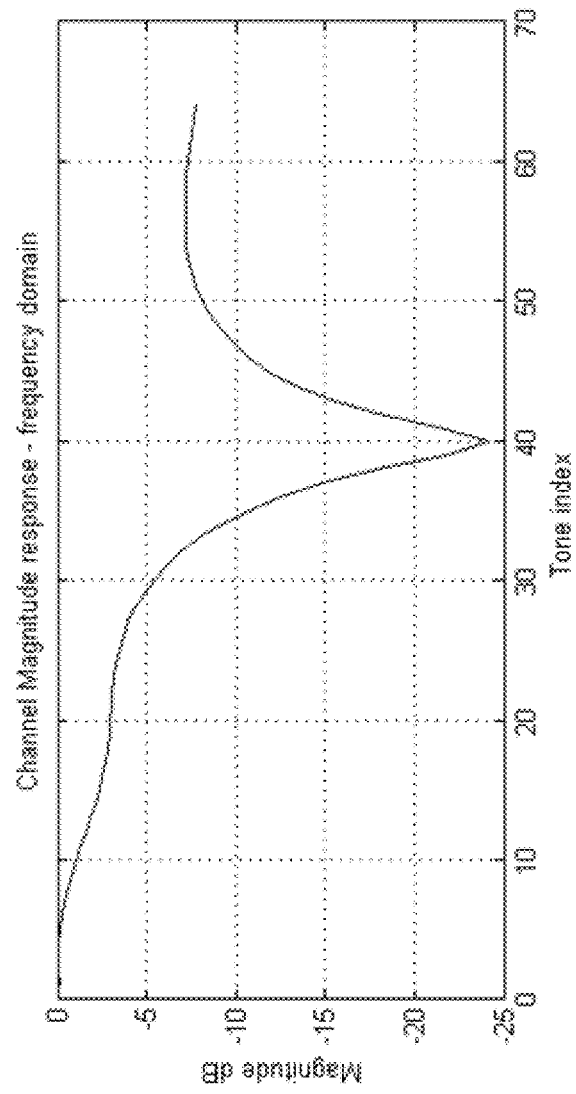

FIGS. 4A and 4B respectively show a first example of channel response in time domain and frequency domain. In FIG. 4A, the channel response decays with time, and the channel taps (sampling points or samples of the channel response, shown at 30-1, 30-2, ..., and 30-7) decrease with time. For example, channel taps, shown at 30-1, 30-2, ..., and 30-7, from 0 to about 0.35 microseconds are dominant taps having a magnitude greater than or equal to a predetermined threshold (e.g., a non-zero magnitude). After about 0.35 microseconds, the channel response dies down significantly, and the channel taps become negligible. Accordingly, the time domain channel response in which the dominant taps are available is limited to around 0.35 microseconds, which is called the delay spread of the channel. FIG. 4B shows the equivalent channel response in frequency domain.

Figure 5A:
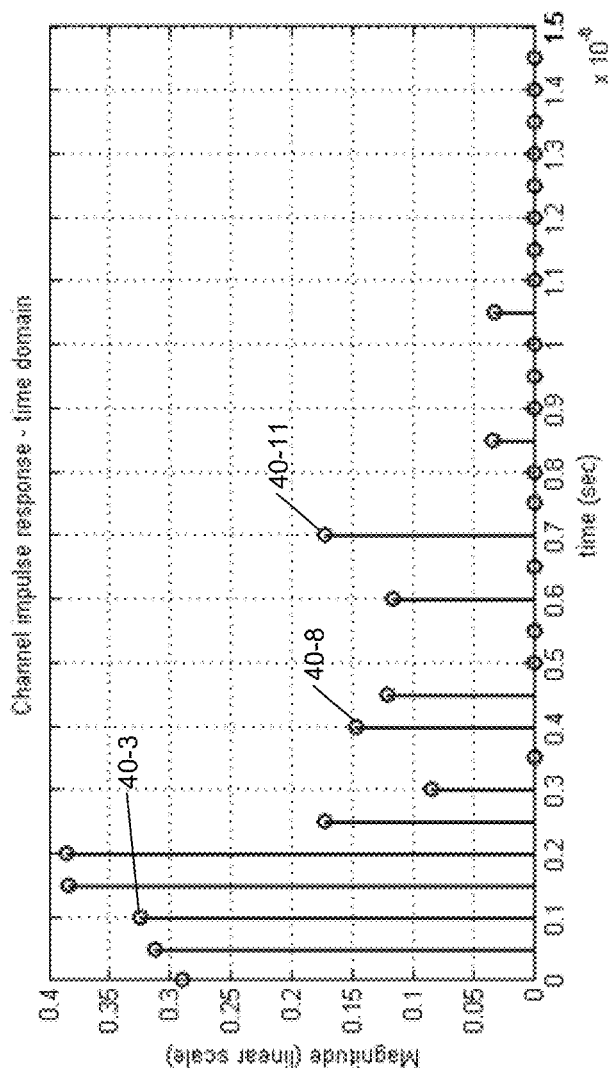
FIGS. 5A and 5B respectively show a second example of channel response in time domain and frequency domain.
Figure 5B:
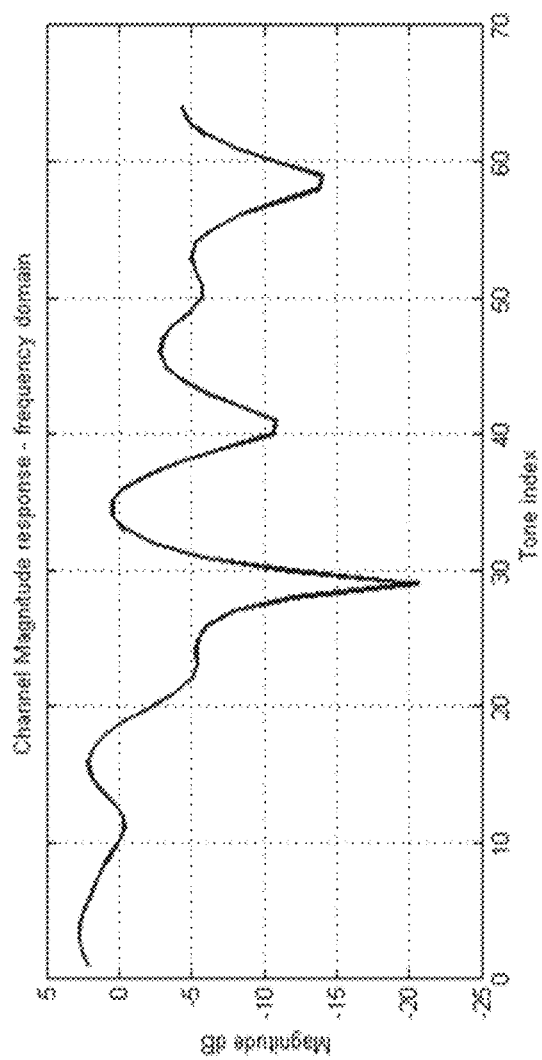

FIGS. 5A and 5B respectively show a second example of channel response in time domain and frequency domain. In FIG. 5A, the channel response spreads to about 1.05 microseconds. That is, the channel has a delay spread of about 1.05 microseconds. Multiple dominant taps (shown at 40-$i$, i=1-13; only few reference numerals are used to preserve clarity) are available within the delay spread of about 1.05 microseconds, after which the channel response dies down significantly. Accordingly, the channel in this example is called a high delay spread channel or a highly scattered channel. FIG. 5B shows the equivalent channel response in frequency domain.

In wireless communication systems such as those employing orthogonal frequency domain multiplexing (OFDM), a transmitter converts a transmit signal from frequency domain to time domain using inverse Fourier transform (IFFT) before transmission. Conversely, a receiver converts a received signal from time domain to frequency domain using FFT.

Channel smoothing is applied in frequency domain since channel estimates are available in frequency domain. Channel smoothing in frequency domain is a filtering operation. For example, suppose that $f(\omega)$ denotes the channel response in frequency domain, and $g(\omega)$ denotes a smoothing filter. The channel smoothing in frequency domain is a convolution of $f(\omega)$ and $g(\omega)$ and is denoted by $f(\omega)*g(\omega)$. The equivalent of the channel smoothing operation in time domain is a multiplication operation of the time domain channel response $F(t)$ and the time domain response of the smoothing filter $G(t)$.

Figure 6:
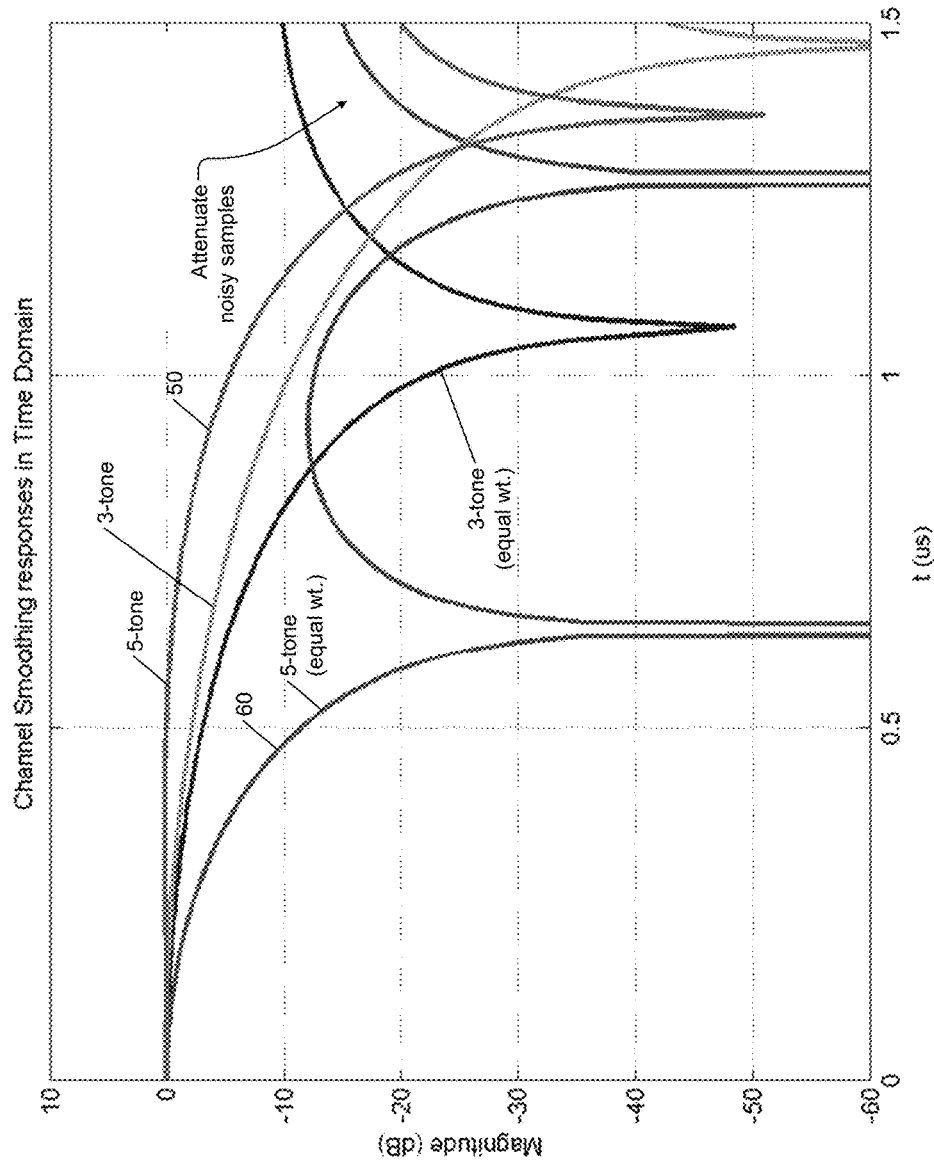
FIG. 6 shows examples of channel smoothing responses in time domain.

FIG. 6 shows that when a smoothing filter with equal weights (e.g., $g(\omega)=(0.5, 0.5, 0.5)$ for 3 tones) is used for channel smoothing in the frequency domain, the dominant taps within the delay spread of the channel in the time domain get attenuated (i.e., get scaled down by $G(t)$, which is the IFFT of $g(\omega)$). Instead, the channel smoothing using unequal weights according to the present disclosure ensures that when the smoothing filter is applied in frequency domain, the smoothing filter does not distort the dominant taps in the time domain. Specifically, with the smoothing filter of the present disclosure, the dominant taps within the delay spread of the channel are not attenuated, and the noisy samples outside the delay spread are heavily attenuated. The smoothing filter of the present disclosure therefore significantly improves the quality of channel estimates regardless of whether SNR is high or low.

More specifically, the present disclosure proposes finding a smoothing filter with N unequal weights (a, b, c, ...) for channel smoothing in frequency domain, where N is the number of tones selected (e.g., 3, 5, ...) for smoothing, depending on the delay spread of the channel and SNR. When these weights are applied to the selected tones in frequency domain, the dominant taps within the delay spread of the channel in time domain are not attenuated. Additionally, the noisy samples outside the delay spread are heavily attenuated.

Figure 7:
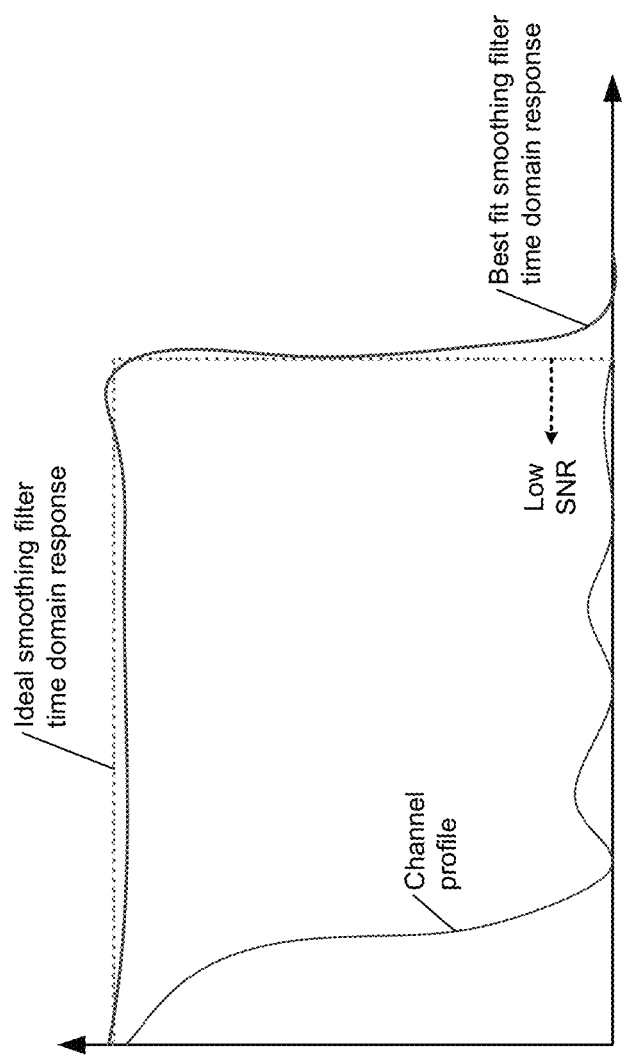
FIG. 7 shows a smoothing filter response in time domain.

In other words, the smoothing filter applied in the frequency domain has a time domain response shown by dotted line in FIG. 7, which represents IFFT of the smoothing filter with unequal weights (a, b, c, ...). Stated differently, when a smoothing filter $g(\omega)=(a, b, c, ...)$ is convolved with $f(\omega)$ in frequency domain, the equivalent time domain response of the smoothing filter resembles the dotted line.

Generally, more than 3 or 5 tones are not used for channel smoothing since the additional tones will fall outside the coherence bandwidth of the channel. Therefore, a smoothing filter with 3 or 5 unequal weights or filter taps can be determined. The filter taps are selected such that the smoothing filter has a time domain response G(t) resembling the dotted line shown in FIG. 7.

The present disclosure relates to finding various sets of values of filter taps and selecting a suitable set of filter taps for channel smoothing based on the delay spread and SNR. The filter taps may be generated a priori (or on the fly as described below) for various delay spreads, stored in the receiver, and selected on the fly based on the observed delay spread and SNR. For example, filter taps or coefficients for filters denoted by $g_1(\omega)=(a_1, b_1, c_1)$ for delay spread $t_1$ with n1 dominant taps, $g_2(\omega)=(a_2, b_2, c_2)$ for delay spread $t_2$ with n2 dominant taps, and so on can be determined. The filter taps or tap weights $(a_i, b_i, c_i)$ are determined such that the filter $g_i(\omega)$ will not attenuate the dominant taps within the delay spread $t_i$ and will heavily attenuate noisy samples outside the delay spread $t_i$. Alternatively, the filter taps may also be determined on the fly based on measured delay spread and SNR.

In use, when a signal is received, the delay spread for the channel is computed based on the highest channel tap value and using a threshold (e.g., a value that is less than 5% of the highest channel tap value). The time difference between sampling points corresponding to the highest channel tap value and the threshold gives the delay spread for the channel.

Alternatively, the energy of the received signal can be measured to determine the delay spread of the channel. Using this method, the delay spread of the channel can be measured as a period of time within which the energy of the received signal drops to or by a predetermined level (e.g., to 98% or by 2%) from the initial or highest energy level.

The measured delay spread is then used to look up a suitable filter $g_i(\omega)=(a_i, b_i, c_i)$. The selected filter $g_i(\omega)=(a_i, b_i, c_i)$ for the measured delay spread is then applied to perform the smoothing operation as described above. Alternatively, the filter taps may also be generated on the fly based on the measured delay spread and SNR.

FIG. 7 shows an example of a channel profile along with an ideal smoothing filter time response and a best fit smoothing filter time response. The best fit smoothing time response is obtained by selecting a smoothing filter as explained above. That is, for a given channel with a given delay spread, a frequency domain filter whose time domain response (i.e. IFFT) closely resembles (i.e., best fits) an inverse step response (shown by dotted line) is determined. Such a filter will not alter channel taps within the delay spread in time domain and will also highly attenuate noise beyond the delay spread.

In high and low SNR cases, different portions of the best fit curve shown in FIG. 7 are important. The horizontal portion of the curve is important at high SNR. At high SNR, the channel taps are not attenuated at all. The vertical portion of the curve is important at low SNR and determines the cutoff point for attenuating significant portion of the noise. The length of the horizontal portion and the timing of the vertical portion (i.e., where to begin the cutoff) are determined by selecting appropriate filter taps or coefficients based on the measured delay spread of the channel and SNR as explained above. As SNR decreases, the selected filter taps will cause the cutoff to occur earlier in time (i.e., the vertical portion of the curve will shift to the left).

In other words, if SNR is high, the cutoff (the vertical portion of the best fit curve) can shift to the right, more channel taps can be used to estimate channel, and the channel taps are not scaled. Conversely, if SNR is low, the cutoff can shift to the left, fewer channel taps can be used to estimate channel, and noisy samples to the right of the cutoff are heavily attenuated. This process smooths the channel estimate.

In addition to the delay spread of the channel and the SNR of the received signal, the selection of the filter taps can also be based on constellation size used to transmit the signal. For example, if the constellation size is high, each tone will carry a lot of data, and the cutoff point will shift to the right.

FIG. 6 discussed earlier shows examples of time domain profiles of filter taps selected according to the present disclosure. For example, curve 50 has the widest delay spread. The filter taps associated with the curve 50 can be used for channel smoothing for a high delay spread channel. If the channel has a very low delay spread, the curve 60 can be used (i.e., the filter taps associated with the curve 60 can be used for channel smoothing for very low delay spread channel). Note that for each curve, within the delay spread, the attenuation is minimum, while the attenuation is high beyond the delay spread of each curve.

Further, for different types of channels, the present disclosure determines the filter taps for different values of delay spread. For example, a lookup table in the receiver can store 3-tone and 5-tone filter taps for each value of delay spread. In use, when the actual delay spread is measured in time domain, the measured delay spread is used to reference the lookup table to select 3-tone and 5-tone filter taps suitable for the measured delay spread. The suitable filter is selected by additionally considering other factors such as SNR, constellation size, and so on, and the selected filter is then applied in frequency domain to smooth the channel estimate as explained above.

Figure 8A:
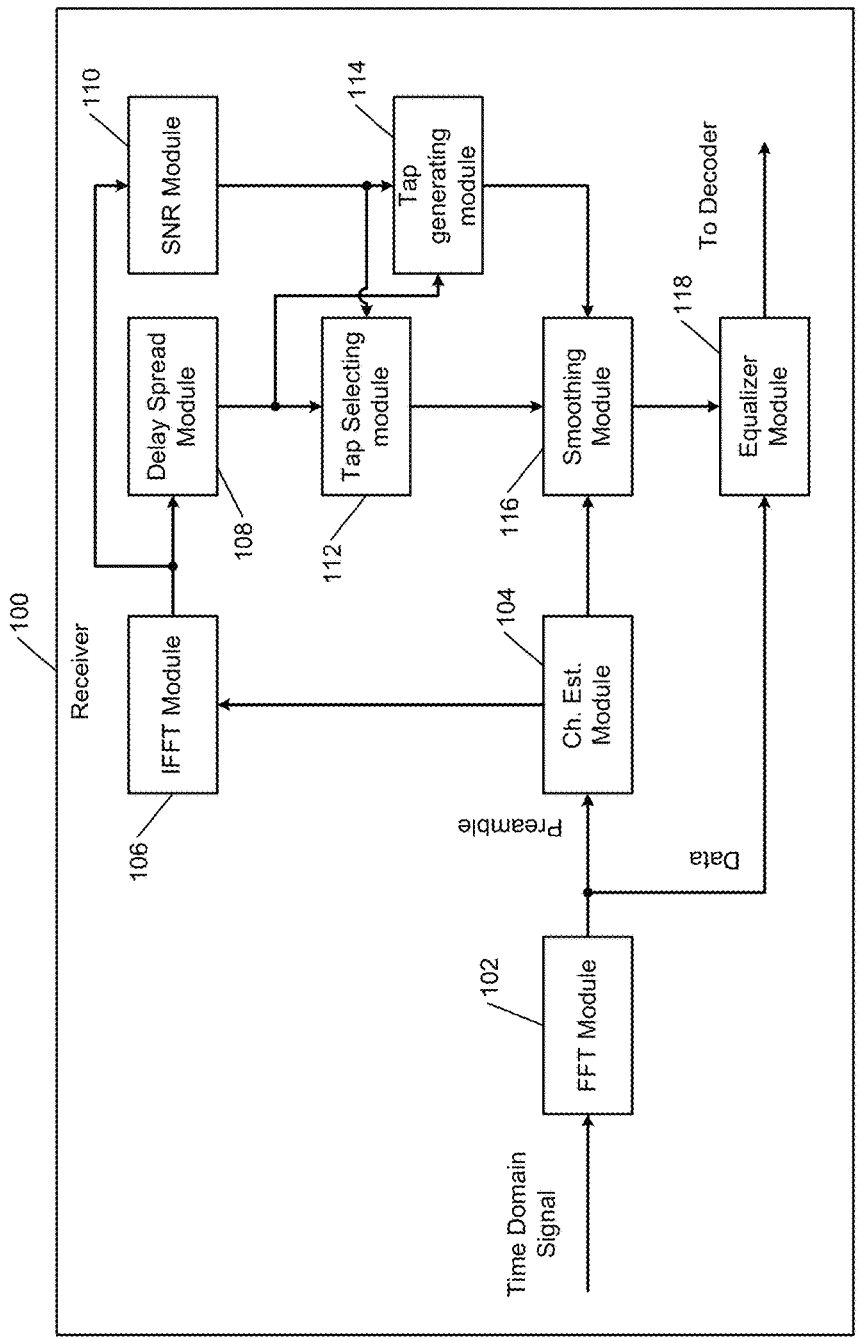
FIG. 8A shows a first implementation of a receiver that smooths channel estimates according to the present disclosure.
Figure 8B:
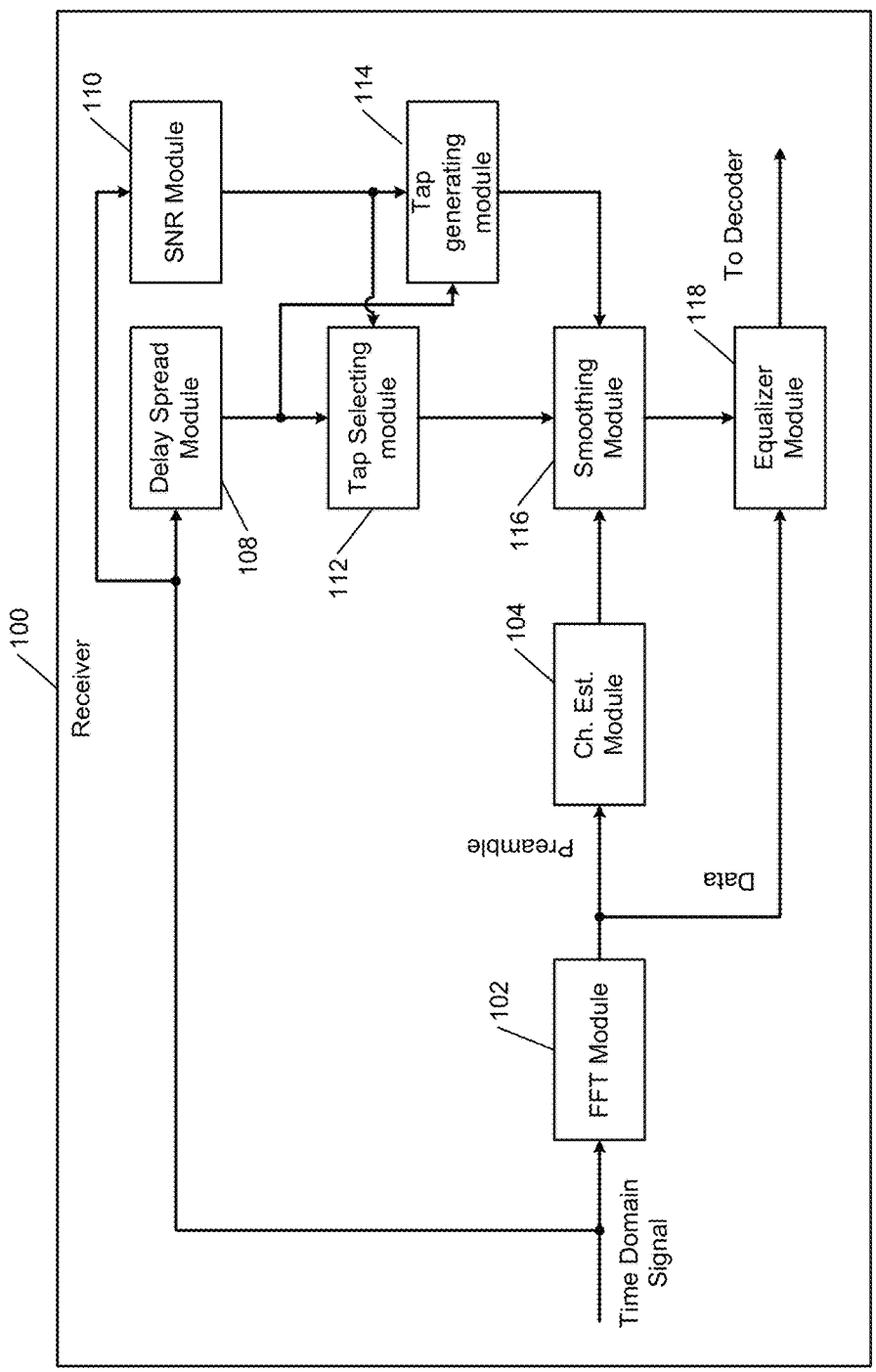
FIG. 8B shows a second implementation of a receiver that smooths channel estimates according to the present disclosure.

FIGS. 8A and 8B show examples of implementing the system for smoothing channel estimates according to the present disclosure. In FIG. 8A, a receiver 100 comprises an FFT module 102, a channel estimation module 104, an IFFT module 106, a delay spread module 108, an SNR module 110, a tap selecting module 112, a tap generating module 114, a smoothing module 116, and an equalizer module 118.

The FFT module 102 receives a time domain signal from an analog front-end (AFE) portion (not shown) of the receiver 100, which preprocesses the received signal (e.g., performs automatic gain control, analog-to-digital conversion, etc.). The FFT module 102 converts the time domain signal into frequency domain. The channel estimation module 104 generates a channel estimate based on a preamble portion of the received signal in frequency domain.

The IFFT module 106 converts the frequency domain signal back into time domain. The delay spread module 108 measures the delay spread of the channel based on the channel impulse response in time domain. The delay spread module 108 can use any threshold-based procedure described above to measure the delay spread. The SNR module 110 measures the SNR of the received signal in time domain.

The tap selecting module 112 selects an appropriate set of filter taps from a lookup table according to the measured delay spread and SNR. Additionally, the tap selecting module 112 may also consider other factors, such as constellation size used by the transmitter to transmit the signal received by the receiver 100, when selecting the filter taps. Alternatively, the tap generating module 114 may generate the filter taps on the fly based on the measured delay spread and SNR and the other factors such as constellation size. In FIG. 8B, the IFFT module 106 is omitted and instead the time domain signal is directly utilized to measure the delay spread and SNR.

The smoothing module 116 smooths the channel estimate generated by the channel estimation module 104 by applying the selected filter taps in the frequency domain. The smoothing module outputs a smoothed channel estimate. The equalizer module 118 equalizes the data portion of the received signal using the smoothed channel estimate. The equalizer module 118 outputs the equalized data for further processing (e.g., to a decoder).

Figure 9:
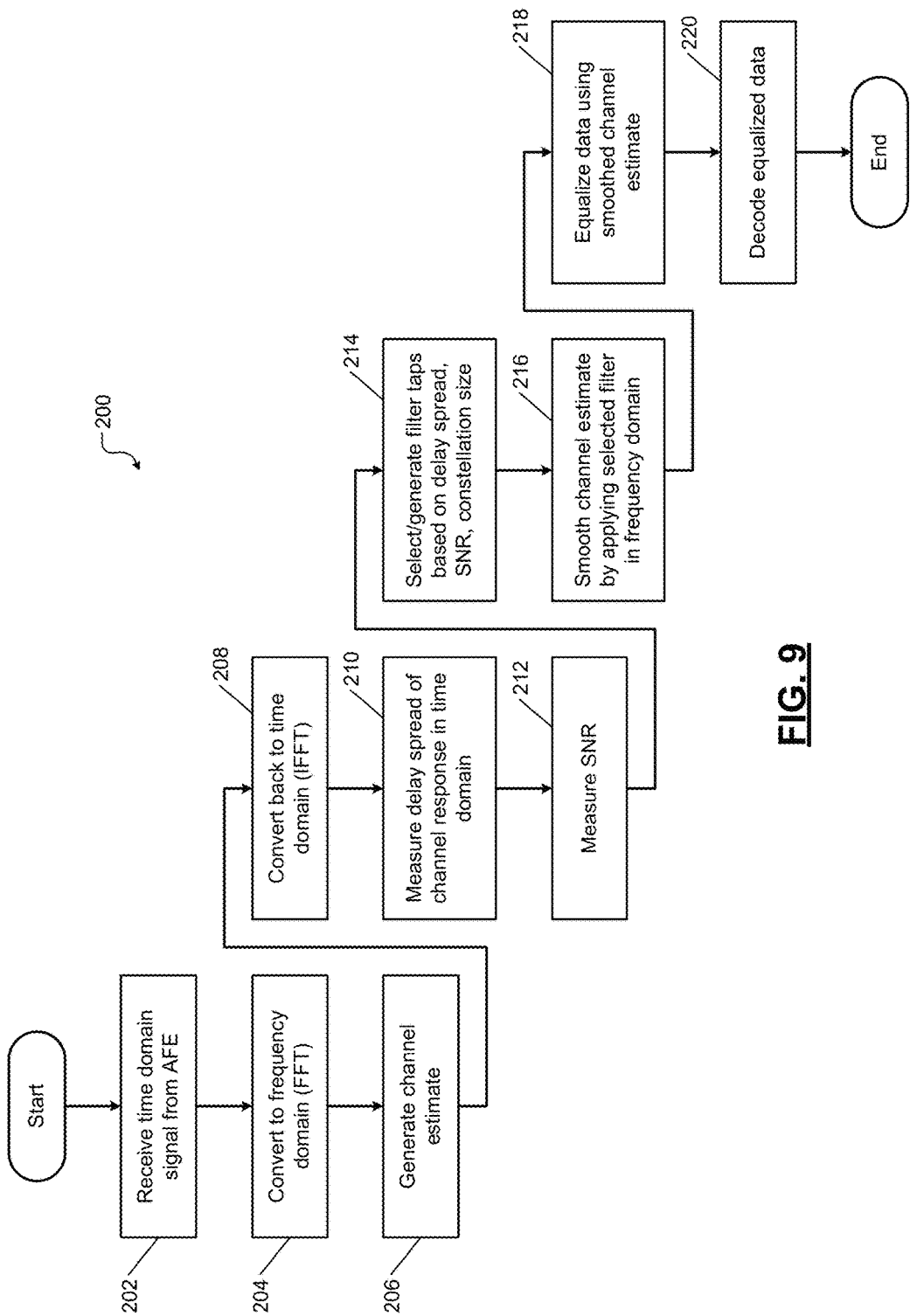
FIG. 9 shows a method for smoothing channel estimates according to the present disclosure.

FIG. 9 shows a method 200 for smoothing channel estimates according to the present disclosure. The method 200 may be performed by one or more modules of the receiver 100 shown in FIGS. 8A and 8B. At 202, the receiver (e.g., the FFT module 102 of the receiver 100) receives a time domain signal from an analog front-end of the receiver. At 204, the receiver (e.g., the FFT module 102 of the receiver 100) converts the time domain signal to frequency domain. At 206, the receiver (e.g., the channel estimate module 104 of the receiver 100) generates a channel estimate in frequency domain.

At 208, the receiver (e.g., the IFFT module 106 of the receiver 100) converts the signal back to time domain. Alternatively, the receiver (e.g., the delay spread module 108 and the SNR module 110 of the receiver 100) uses the time domain signal received from the analog front-end. At 210, the receiver (e.g., the delay spread module 108 of the receiver 100) measures the delay spread of the channel in time domain. The receiver (e.g., the delay spread module 108 of the receiver 100) uses one or more threshold-based procedures described above to measure the delay spread of the channel. At 212, the receiver (e.g., the SNR module 110 of the receiver 100) measures SNR.

At 214, the receiver (e.g., the tap selecting module 112 of the receiver 100) selects filter taps for smoothing filter based on the measured delay spread and SNR. Additionally, the receiver (e.g., the tap selecting module 112 of the receiver 100) may consider other factors such as the constellation size used by the transmitter. Alternatively, the receiver (e.g., the tap generating module 114 of the receiver 100) can generate the filter taps on the fly based on the measured delay spread and SNR and the other factors such as the constellation size. At 216, the receiver (e.g., the smoothing module 116 of the receiver 100) applies the selected smoothing filter to smooth the channel estimate in the frequency domain.

At 218, the receiver (e.g., the equalizer module 118 of the receiver 100) equalizes the data in the received signal using the smoothed channel estimate. At 220, the receiver (e.g., a decoder of the receiver 100) decodes the equalized data.

The wireless communications described in the present disclosure can be conducted in full or partial compliance with IEEE standard 802.11-2016, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2016 may be supplemented by draft IEEE standard 802.11ah-2016 and/or draft IEEE standard 802.11ai-2016.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMUUNK, and Python®.

What is claimed is:

1. A receiver comprising:
a channel estimation module to generate a channel estimate for a channel in frequency domain based on a signal received through the channel in time domain;
a delay spread module to determine a delay spread of the channel in the time domain, wherein the delay spread is an amount of time after which a channel response drops to less than or equal to a predetermined threshold; and
a smoothing module to smooth the channel estimate by applying a filter with unequal taps in the frequency domain,
wherein the taps are based on the delay spread,
wherein the filter does not attenuate samples of the channel response within the delay spread in the time domain, and
wherein the filter attenuates noise outside the delay spread of the channel.

2. The receiver of claim 1 wherein the taps are selected from a plurality of taps determined a priori for various values of delay spread and stored in a lookup table.

3. The receiver of claim 1 further comprising a tap generating module to generate the taps based on the delay spread.

4. The receiver of claim 1 further comprising a signal to noise ratio (SNR) module to determine an SNR of the signal in the time domain, wherein the taps are further based on the SNR.

5. The receiver of claim 1 wherein the signal is modulated using orthogonal frequency domain multiplexing (OFDM) and has a constellation size, and wherein the taps are further based on the constellation size of the signal.

6. The receiver of claim 1 wherein the smoothing module interpolates a plurality of frequency tones of the signal using the unequal taps to smooth the channel estimate.

7. The receiver of claim 6 wherein a number of frequency tones selected for smoothing is based on a coherence bandwidth of the channel, which is a frequency bandwidth for which channel characteristics remain similar.

8. The receiver of claim 1 further comprising:
a signal to noise ratio (SNR) module to determine an SNR of the signal in the time domain,
wherein the taps are selected from a plurality of taps stored in a lookup table based on the delay spread and the SNR.

9. The receiver of claim 1 further comprising:
a signal to noise ratio (SNR) module to determine an SNR of the signal in the time domain; and
a tap generating module to generate the taps based on the delay spread and the SNR.

10. The receiver of claim 1 wherein the filter has an inverse step response in the time domain.

11. The receiver of claim 1 further comprising an equalizer module to equalize data in the signal based on the smoothed channel estimate, wherein a decoder decodes the equalized data.

12. A method comprising:
generating a channel estimate for a channel in frequency domain based on a signal received through the channel in time domain;
determining a delay spread of the channel in the time domain, wherein the delay spread is an amount of time after which a channel response drops to less than or equal to a predetermined threshold;
smoothing the channel estimate by applying a filter with unequal taps in the frequency domain;
equalizing data in the signal based on the smoothed channel estimate; and
decoding the equalized data,
wherein the taps are based on the delay spread,
wherein the filter has an inverse step response in the time domain,
wherein the filter does not attenuate samples of the channel response within the delay spread in the time domain, and
wherein the filter attenuates noise outside the delay spread of the channel.

13. The method of claim 12 further comprising selecting the taps from a plurality of taps determined a priori for various values of delay spread and stored in a lookup table.

14. The method of claim 12 further comprising generating the taps based on the delay spread.

15. The method of claim 12 further comprising:
determining a signal to noise ratio (SNR) of the signal in the time domain; and
selecting the taps further based on the SNR.

16. The method of claim 12 wherein the signal is modulated using orthogonal frequency domain multiplexing (OFDM) and has a constellation size, the method further comprising selecting the taps further based on the constellation size of the signal.

17. The method of claim 12 wherein the smoothing comprises interpolating a plurality of frequency tones of the signal using the unequal taps to smooth the channel estimate.

18. The method of claim 17 wherein the interpolating comprises selecting a number of frequency tones for smoothing based on a coherence bandwidth of the channel, which is a frequency bandwidth for which channel characteristics remain similar.

19. The method of claim 12 further comprising:
determining a signal to noise ratio (SNR) of the signal in the time domain; and
selecting the taps from a plurality of taps stored in a lookup table based on the delay spread and the SNR.

20. The method of claim 12 further comprising:
determining a signal to noise ratio (SNR) of the signal in the time domain; and
generating the taps based on the delay spread and the SNR.

* * * * *